US009539782B2

(12) United States Patent
Hall et al.

(10) Patent No.: US 9,539,782 B2
(45) Date of Patent: Jan. 10, 2017

(54) INDIVIDUAL RESISTANCE HEATING FOR HIGH-PRESSURE HIGH-TEMPERATURE CELL

(71) Applicant: Novatek IP, LLC, Provo, UT (US)

(72) Inventors: David R. Hall, Provo, UT (US); Scott S. Dahlgren, Alpine, UT (US); Michael Hall, Springville, UT (US); Ronald B. Crockett, Spring City, UT (US); Timothy C. Duke, Provo, UT (US)

( * ) Notice: Subject to any disclaimer, the term of this patent is extended or adjusted under 35 U.S.C. 154(b) by 0 days.

(21) Appl. No.: 14/838,118

(22) Filed: Aug. 27, 2015

(65) Prior Publication Data
US 2016/0059506 A1 Mar. 3, 2016

Related U.S. Application Data

(63) Continuation-in-part of application No. 14/837,761, filed on Aug. 27, 2015.

(60) Provisional application No. 62/044,094, filed on Aug. 29, 2014, provisional application No. 62/045,752, filed on Sep. 4, 2014, provisional application No. 62/052,191, filed on Sep. 18, 2014.

(51) Int. Cl.
| | |
|---|---|
| *B29C 43/04* | (2006.01) |
| *B29C 43/32* | (2006.01) |
| *B30B 15/34* | (2006.01) |
| *B30B 11/00* | (2006.01) |
| *B01J 3/06* | (2006.01) |

(52) U.S. Cl.
CPC ............... *B30B 15/34* (2013.01); *B01J 3/067* (2013.01); *B30B 11/004* (2013.01); *B30B 11/007* (2013.01)

(58) Field of Classification Search
CPC ....... B30B 11/004; B30B 11/007; B30B 15/34
USPC .......................................... 425/77, 405.2, 78
See application file for complete search history.

(56) References Cited

U.S. PATENT DOCUMENTS

| | | | | |
|---|---|---|---|---|
| 3,328,841 A | * | 7/1967 | Brayman | B01J 3/08 425/77 |
| 3,829,544 A | * | 8/1974 | Hall | B01J 3/062 264/125 |
| 4,196,181 A | * | 4/1980 | Vereschagin | B01J 3/062 425/77 |
| 6,336,802 B1 | | 1/2002 | Hall | |
| 7,371,280 B2 | * | 5/2008 | Sung | B01J 3/067 425/77 |
| 8,074,566 B1 | * | 12/2011 | Bach | B01J 3/062 100/102 |
| 8,371,212 B1 | * | 2/2013 | Bach | B01J 3/062 100/102 |

OTHER PUBLICATIONS

Wang & He, A hybrid pressure cell of pyrophyllite and magnesium oxide to extend the pressure range for large volume cubic presses, High Pressure Research, Feb. 21, 2012.

* cited by examiner

*Primary Examiner* — Joseph S Del Sole
*Assistant Examiner* — Thukhanh T Nguyen
(74) *Attorney, Agent, or Firm* — Philip W. Townsend, III (57) ABSTRACT

High-pressure high-temperature presses are commonly employed to create superhard materials used in such fields as road milling, mining and trenching, to breakup tough materials such as asphalt, concrete and rock. Many such presses comprise a plurality of piston assemblies that may act in concert to pressurize a cell. Such a cell may comprise a body with a plurality of canisters disposed therein and at least one unique heater element adjacent each of the canisters. Heat may be generated within such a press by forming an electrical circuit with the unique heater element and anvils surrounding the cell.

17 Claims, 10 Drawing Sheets

INDIVIDUAL RESISTANCE HEATING FOR HIGH-PRESSURE HIGH-TEMPERATURE CELL

CROSS REFERENCE TO RELATED APPLICATIONS

This patent claims priority to U.S. Provisional Pat. App. No. 62/044,094 entitled "Symmetrical Cell Design" and filed Aug. 29, 2014; U.S. Provisional Pat. App. No. 62/045,752 entitled "Individual Resistance Heating for a High Pressure Cell" and filed Sep. 4, 2014; and U.S. Provisional Pat. App. No. 62/052,191 entitled "Central Conductor Comprising Indentations for HPHT Cell" and filed Sep. 18, 2014; which are incorporated herein by reference for all that they contain.

This patent is also a continuation-in-part of U.S. patent application Ser. No. 14/837,761 entitled "Balanced Cell for High-Pressure High-Temperature Press" and filed Aug. 27, 2015.

BACKGROUND OF THE INVENTION

In such fields as road milling, mining and trenching, superhard materials, such as polycrystalline diamond, may be used to breakup tough materials such as asphalt, concrete and rock. High-pressure high-temperature ("HPHT") presses are commonly employed to create such superhard materials. While HPHT presses have been made in a variety of styles over the years, many HPHT presses comprise a plurality of piston assemblies that may act in concert to pressurize a cell. One example of such an HPHT press is disclosed in U.S. Pat. No. 6,336,802 to Hall which describes a press with a frame comprising intersecting boreholes with means for attachment of a plurality of cartridges. Each cartridge may comprise a piston therein with an anvil protruding there from into a cavity resulting from an intersection of the boreholes. Advancement of the anvils toward a center of the cavity may enclose and define a high-pressure chamber within the press.

A cell may be disposed within such a high-pressure chamber comprising the raw components required to form superhard materials. One example of raw components capable of forming a superhard material comprises diamond grains disposed within a metal canister adjacent a carbide substrate. The carbide substrate may comprise a catalyst that may sweep into the diamond grains under certain HPHT conditions to aid in sintering the diamond grains together. One or more such canisters may be surrounded by a pressure-transferring medium, such as pyrophyllite, that may form a pressure sealing gasket within gaps between adjacent anvils as well as balance pressure around the canisters. Electrically resistive materials may also be disposed within such cells that may heat the cells to desired temperatures when electricity is passed through the cell from one anvil to another.

Figure 1:
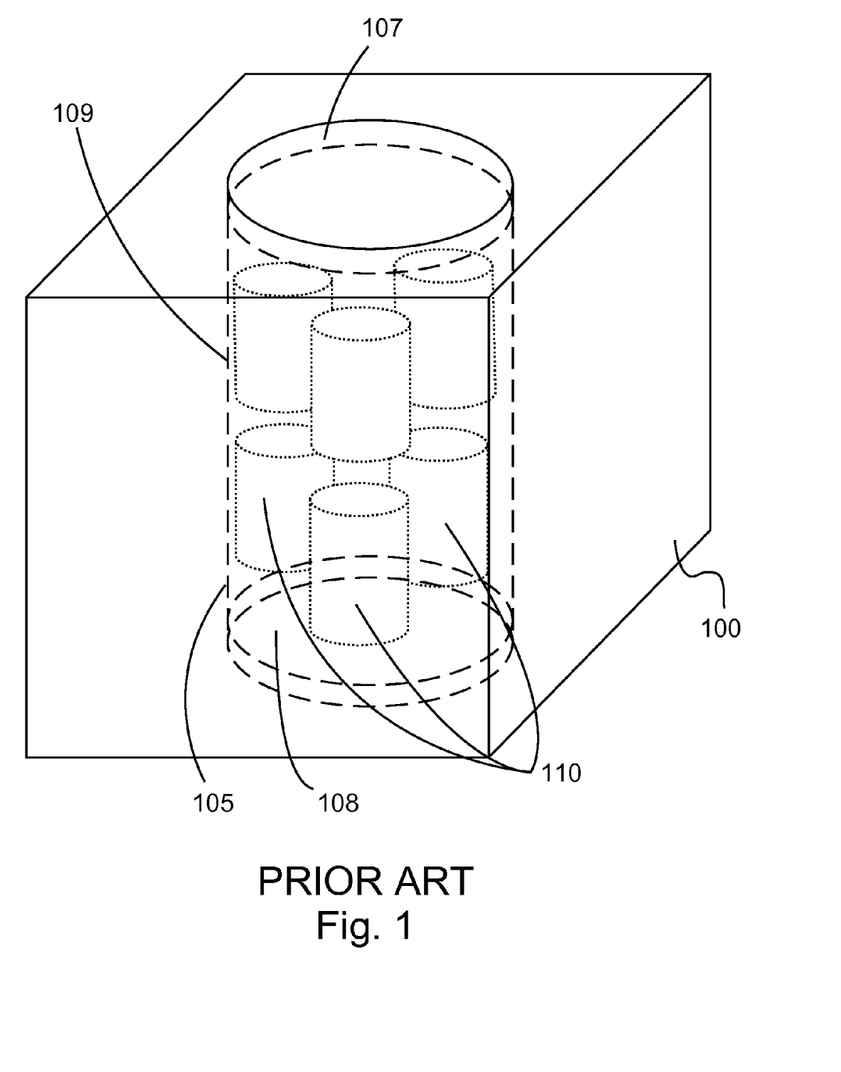
FIG. 1 is a perspective view of an embodiment of an HPHT cell configuration known in the prior art.

One known cell configuration, shown in FIG. 1, comprises a cube 100 generally made of pyrophyllite. The cube 100 comprises a cylindrical bore 105 there though. A plurality of metal canisters 110 may be stacked face-to-face, secured within a salt form 108 disposed within the cylindrical bore 105. A metal tube 109 may surround the salt form 108 and provide an electrical path from one end to another. At least one electrically resistive heater 107 may sit on either end of the salt form 108 and provide heat when electricity is passed there through.

Figure 2:
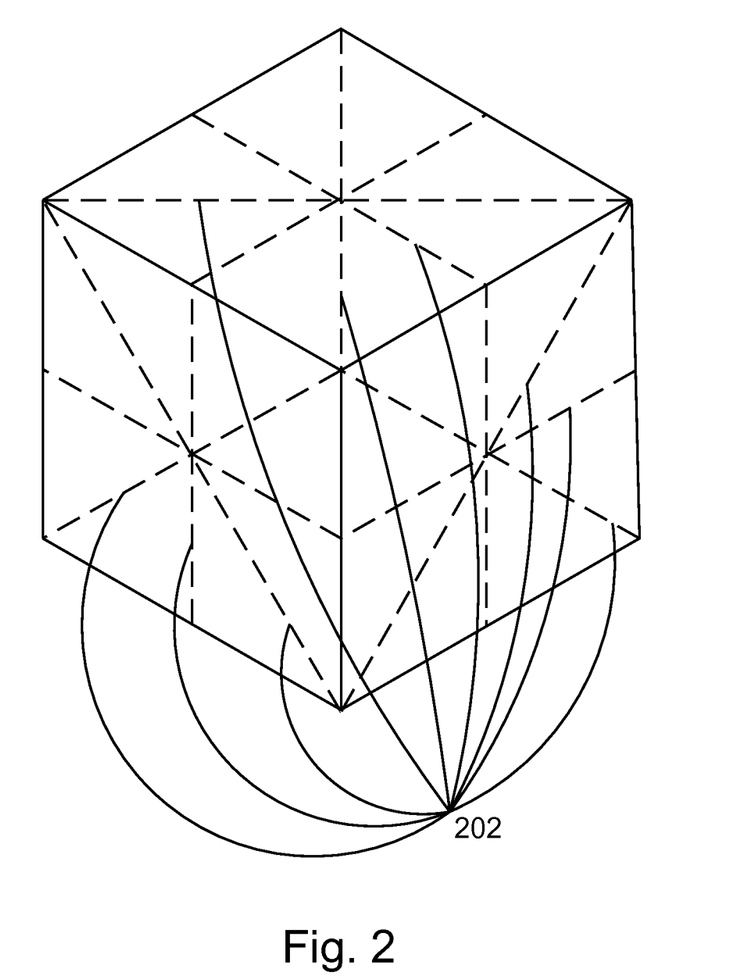
FIG. 2 is a perspective view of an embodiment of a cube showing nine possible planes of symmetry.

While the cell configuration shown in FIG. 1 may be symmetrical end-to-end, it lacks symmetry in the eight other possible planes of symmetry 202 shown in FIG. 2. Such asymmetry may lead to uneven pressure and/or heat distribution. Specifically, each of the plurality of canisters may experience different pressure and temperature gradients throughout its interior based on its unique position relative to the anvils and resistive heaters. Thus, a need exists for more balanced cell designs than previously existing.

BRIEF SUMMARY OF THE INVENTION

A cell for an HPHT press may comprise a body with a plurality of canisters disposed therein. At least one unique heater element, such as an electrically resistive heater, may be disposed adjacent each of the canisters.

At least one temperature sensor may also be disposed within the body to measure temperature. In various embodiments, there may be at least one temperature sensor for each of the canisters or for each of the unique heater elements.

The at least one heater element may form part of an electrical circuit reaching outside of the body. Such an electrical circuit may have various configurations. In an example configuration, electricity may pass from a first anvil into the cell, through a first heater element adjacent a first canister, through a first electrically conductive tube about a diameter of the first canister, through a center form within the body, through a second electrically conductive tube about a second canister, through a second heater element and to a second anvil.

Heat may be generated within the cell when the anvils are energized. Additionally, a voltage drop over each unique heater element, and thus the amount of heat generated, may be determined from voltages at the anvils. Once determined, the voltage drop over each unique heater element may be regulated by adjusting the voltages at the anvils.

When a cell comprises a plurality of heater elements, additional electrical circuits comprising at least one different heater element and at least one different anvil may be created. Thus, a difference in electrical resistance between unique heater elements may be determined from voltages at the anvils. In some embodiments, it may be desirable to alternate between the various electrical circuits.

Where a center form comprises part of a first electrical circuit with a unique heater element on either side, a second electrical circuit may have at least one of the unique heater elements of the first electrical circuit and at least one different unique heater element.

DETAILED DESCRIPTION OF THE DRAWINGS

Figure 3:
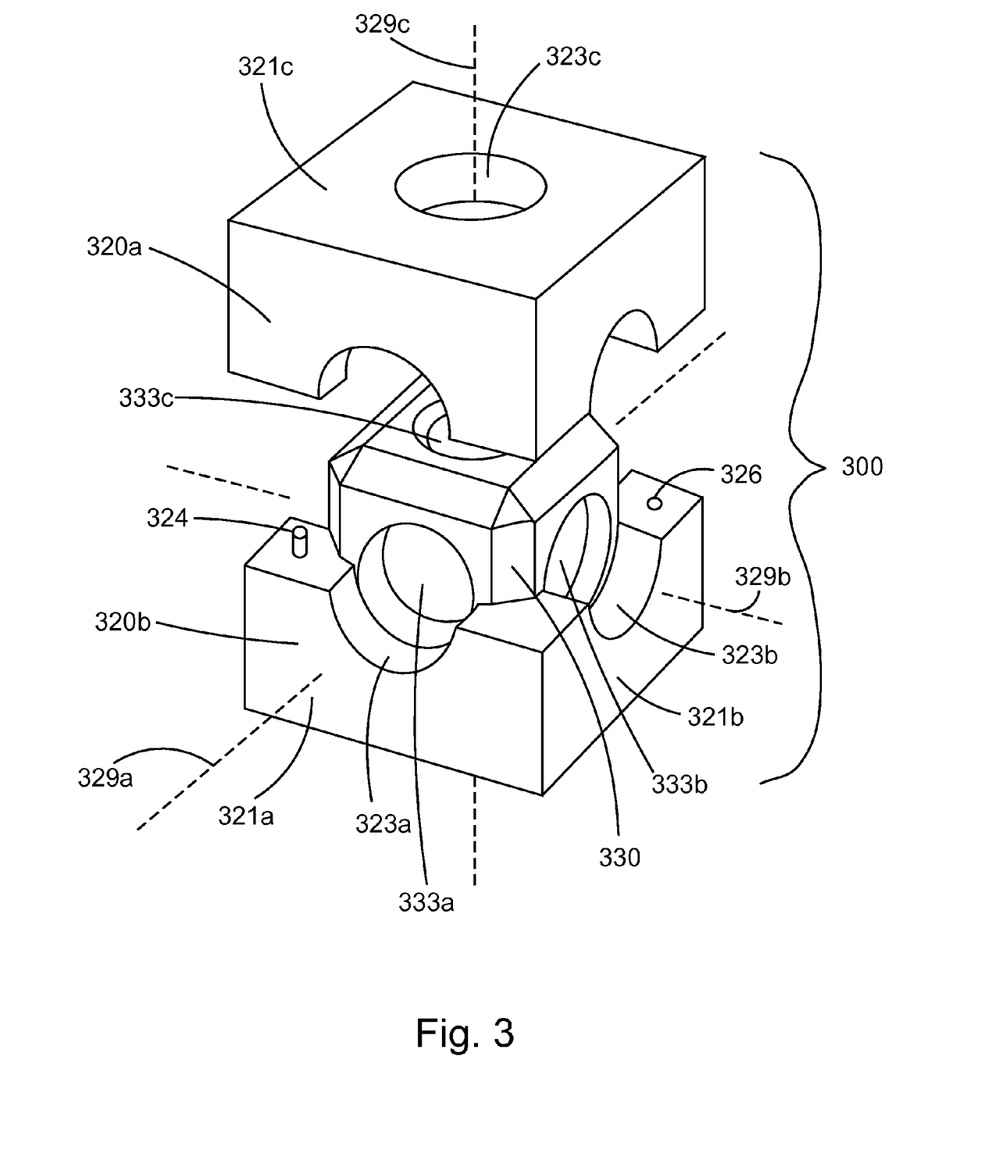
FIG. 3 is a partially-exploded perspective view of an embodiment of parts of an HPHT cell configuration comprising a generally cubic shaped body formed from two mating forms.

FIG. 3 shows an embodiment of parts of a cell for an HPHT press comprising a generally cubic shaped body 300 formed from two mating forms 320a, b. The two mating forms 320a, b may be made of natural or synthetic pyrophyllite or other pressure-transferring materials and fit like a clam shell over a center form 330 disposed within the body 300. The center form 330 may be made of salt or other pressure-transferring materials. To hold the body together, the two mating forms 320a, b may be press fit onto the center form 330 or comprise pins 324 that may fit into mating slots 326.

The generally cubic shaped body 300 comprises six sides 321a, b, c, (only three of which are viewable) each comprising a bore 323a, b, c, therein. Each of the bores 323a, b, c may comprise a respective center axis 329a, b, c passing through a center of the body and be sized to receive an individual canister (not shown). Similarly, the center form 330 may comprise six seats 333a, b, c, each aligned with one of the bores 323a, b, c and sized to receive a canister.

Figure 4:
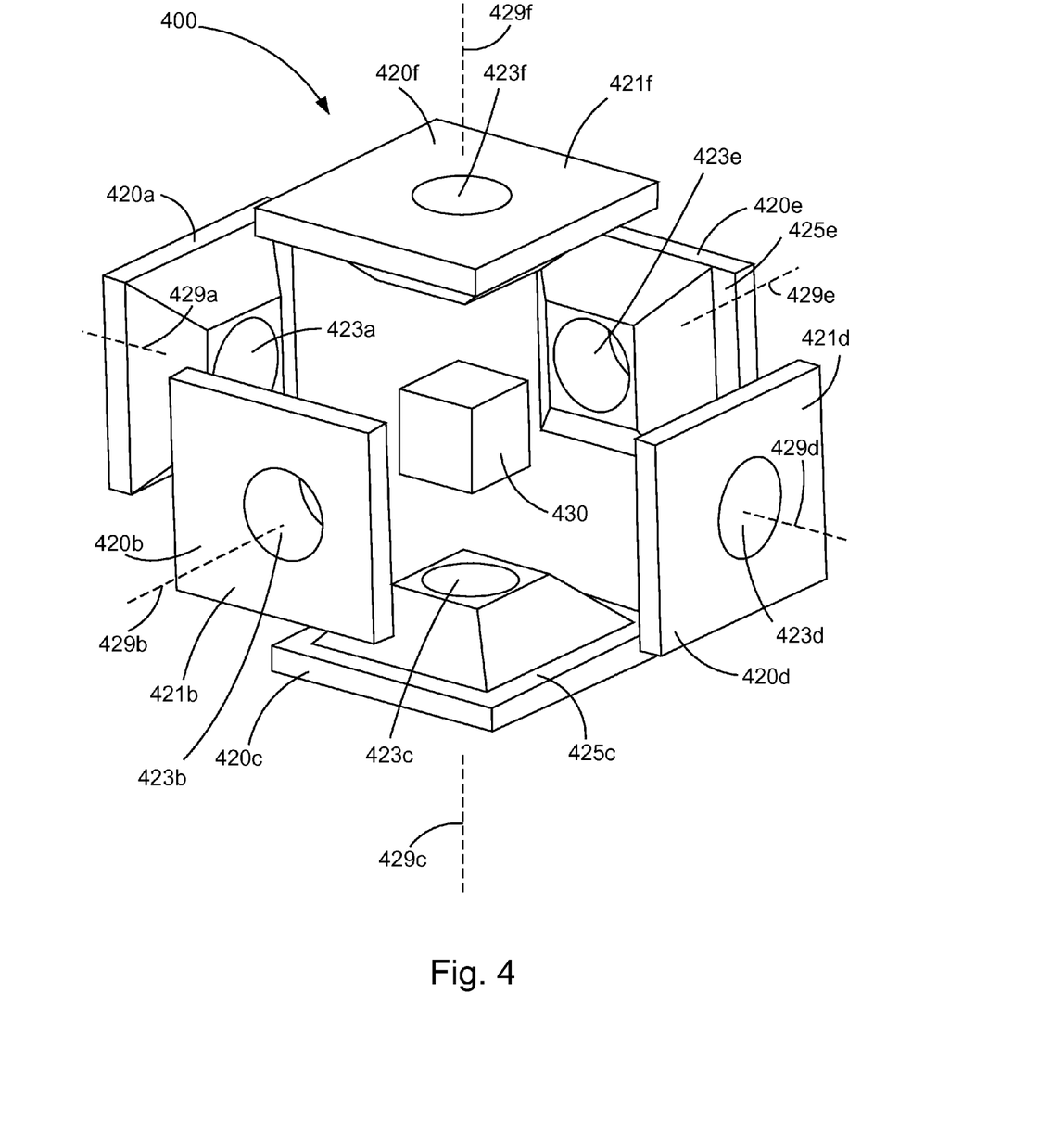
FIG. 4 is an exploded perspective view of an embodiment of parts of an HPHT cell configuration comprising a generally cubic shaped body formed from six generally pyramidal shaped forms.

FIG. 4 shows another embodiment of parts of a cell for an HPHT press comprising a generally cubic shaped body 400 formed from six generally pyramidal shaped forms 420a, b, c, d, e, f. The body 400 comprises six sides 421b, d, f, (only three of which are viewable) each comprising a bore 423a, b, c, d, e, f therein. Each of the bores 423a, b, c, d, e, f may comprise a respective center axis 429a, b, c, d, e, f passing through a center of the body and be sized to receive an individual canister (not shown). The generally pyramidal shaped forms 420a, b, c, d, e, f may each comprise a truncated apex such that they may fit around a center form 430 disposed within the body 400. Some of the generally pyramidal shaped forms (such as 420c and e) may comprise edges 425c, e that may overlap an edge of an adjacent form when assembled.

Figure 5:
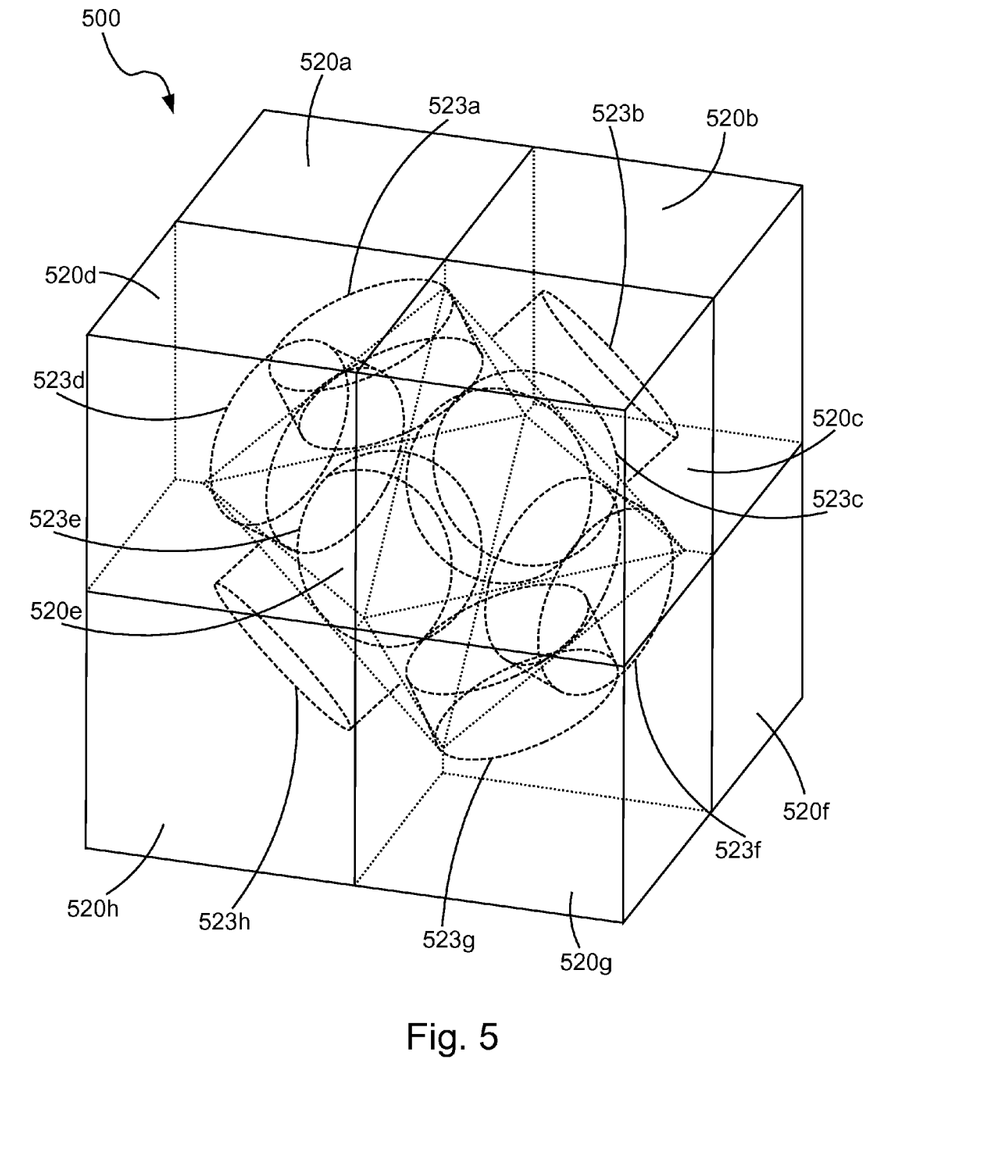
FIG. 5 is a perspective view of an embodiment of parts of an HPHT cell configuration comprising a generally cubic shaped body formed from eight generally cubic shaped forms.

FIG. 5 shows yet another embodiment of parts of a cell for an HPHT press comprising a generally cubic shaped body 500 formed from eight generally cubic shaped forms 520a, b, c, d, e, f, g and h each with a truncated corner comprising a surface perpendicular to an axis passing through a center of the body 500. A bore 523a, b, c, d, e, f, g and h is disposed within each of the respective cubic shaped forms 520a, b, c, d, e, f, g and h. Each of the bores 523a, b, c, d, e, f, g and h may be sized to receive an individual canister (not shown) comprising an axis passing through a center of the body 500 and a respective corner of the body 500.

Figure 6:
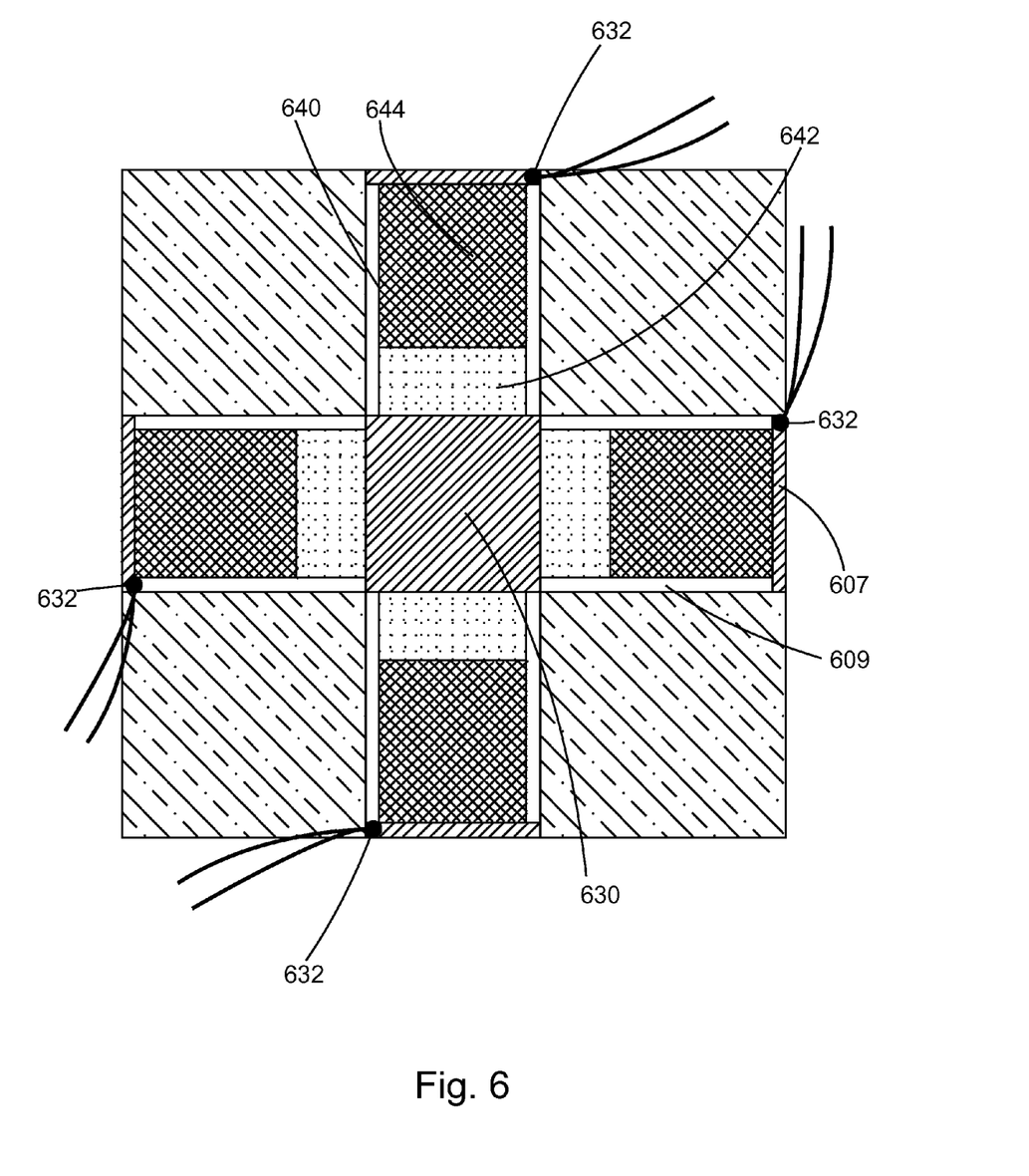
FIG. 6 is a cross-sectional view of an embodiment of an HPHT cell configuration comprising canisters disposed within bores on each side thereof.

Regardless of the configuration chosen, use of such a balanced cell in an HPHT press has many advantages. For example, FIG. 6 shows an embodiment of a cell comprising canisters 640 disposed within bores on each side thereof. Each of the canisters 640 may be formed of a metal, such as niobium, and have superhard grains 642, such as diamond grains, disposed adjacent a substrate 644, such as a tungsten carbide substrate, therein. An individual metal tube 609 may surround each of the canisters 640 and provide an electrical path from one end to another. Further, each of the canisters 640 may have at least one electrically resistive heater 607 sitting on either end thereof that may provide heat when electricity is passed there through. In the embodiment shown, a center form 630 disposed within the cell may also be electrically resistive and act as a uniform heater for the cell.

In such a configuration, as anvils of an HPHT press converge and apply pressure to each side of the cell, each of the canisters may receive substantially equal amounts of pressure and from the same relative directions. It is believed that such substantially equal amounts of pressure may result in more uniform end products. Further, as electricity is passed from one anvil to another, it may travel through a first electrically resistive heater, a first metal tube, the center form, and then out a second metal tube and a second electrically resistive heater. Through this electrical path, each of the canisters may receive substantially equal amounts of heat and from the same relative directions. It is believed that such substantially equal amounts of heat may further result in more uniform end products. To more accurately ensure substantially equal amounts of heat, at least one temperature sensor 632, such as a thermocouple or thermistor, may be disposed within the body to measure the temperature. In various embodiments, there may be at least one temperature sensor for each of the canisters 640 or for each of the electrically resistive heaters 607.

Figure 7A:
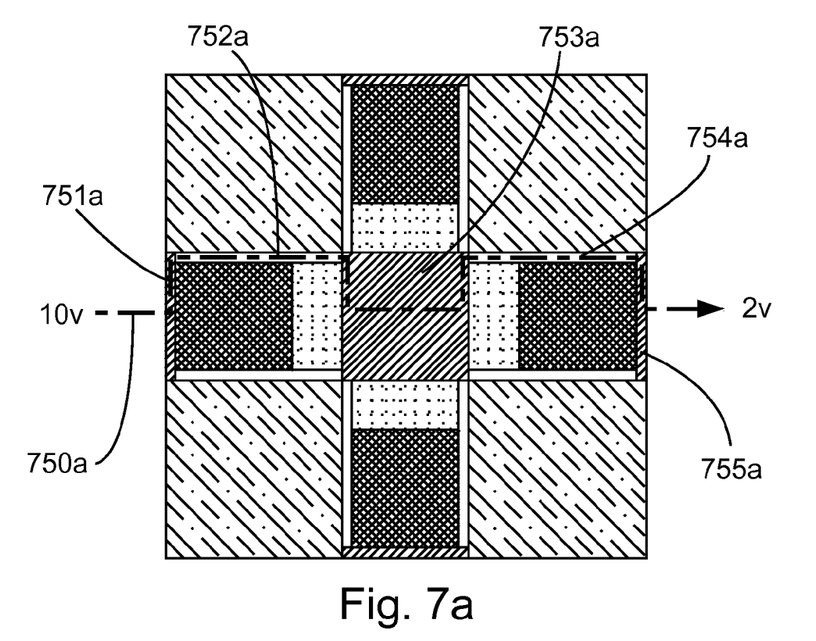
FIGS. 7a and 7b are cross-sectional representations of embodiments of electricity passing through HPHT cell configurations.
Figure 7B:
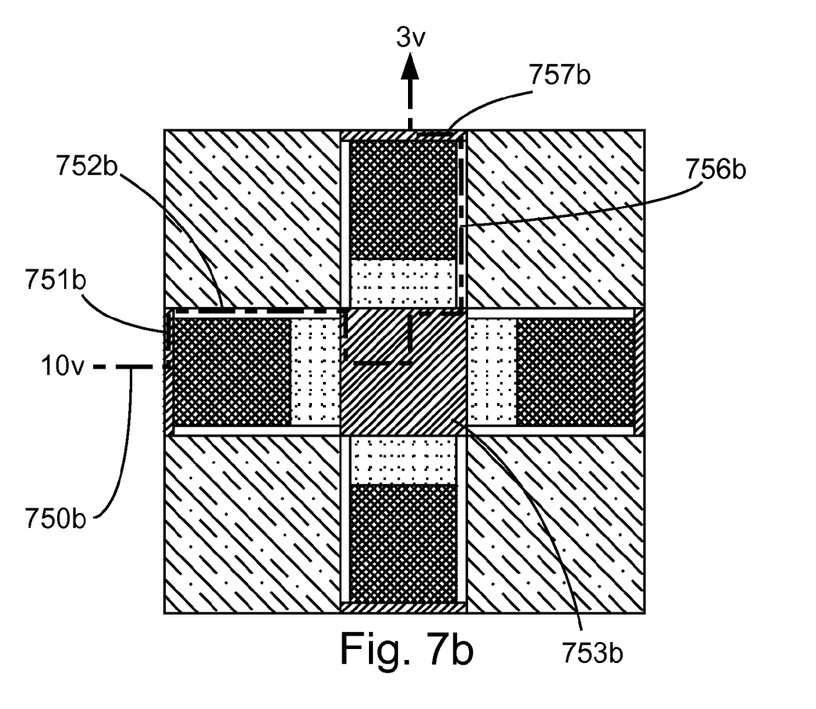

FIGS. 7a and 7b show embodiments of electricity 750a, b passing through cells with different natural electrical resistances within electrically resistive heaters sitting on either end of canisters disposed therein. These natural differences in electrical resistance may cause differences in voltage drops across such resistive heaters and, thereby, in amounts of heat dissipated. By alternating which anvils are electrically charged it may be possible to determine which pairs of resistive heaters are naturally dissipating more heat into their adjacent canisters. With this knowledge, it may be possible to increase or decrease the amount of heat being dissipated by each resistive heater by regulating the voltages of each anvil to equalize or otherwise more accurately control the temperature experienced by each canister.

For instance, FIG. 7a shows electricity 750a passing from a first anvil (not shown) having a voltage of 10v, through a first electrically resistive heater 751a, a first metal tube 752a, a center form 753a, a second metal tube 754a, and a second electrically resistive heater 755a, to a second anvil (not shown) having a voltage of 2v. This means that, due to the resistance in the electrical circuit, 8 volts have dissipated into the system in the form of heat. FIG. 7b shows electricity 750b passing from a first anvil (not shown) having a voltage of 10v, through a first electrically resistive heater 751b, a first metal tube 752b, a center form 753b, a third metal tube 756b, and a third electrically resistive heater 757a, to a third anvil (not shown) having a voltage of 3v. Thus, when electricity is passed through a different pair of resistive heaters, 7 volts are dissipated into the system in the form of heat. With this knowledge, it may be desirable to increase or decrease the voltage at the second or third anvils to equalize or otherwise more accurately control the heat received by each canister. As discussed previously, it is believed that substantially equal amounts of heat supplied to each canister may result in more uniform end products.

Figure 8A:
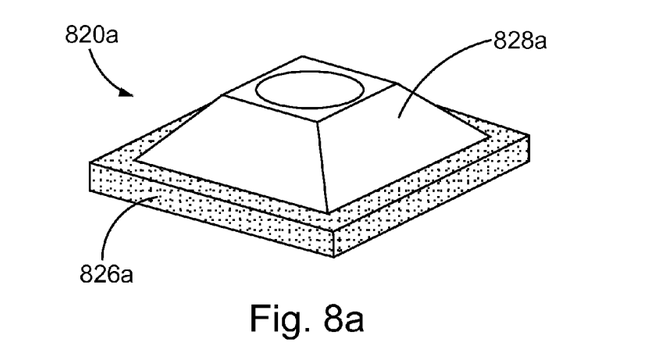
FIG. 8a is a perspective view of an embodiment of a generally pyramidal shaped form comprising a base comprising a different material than a remainder thereof.

One of the advantages of forming a balanced cell partially from generally pyramidal shaped forms as described above is the ease of creating a body comprising multiple materials comprising differing properties. For instance, FIG. 8a shows an embodiment of a generally pyramidal shaped form 820*a* comprising a base 826*a* comprising a different material than a remainder 828*a* thereof. This type of configuration may be desirable when a portion of a cell forming the edges thereof is expected to squeeze out between adjacent anvils when pressurized in an HPHT press. Such squeezing may be desirable to form a gasket between adjacent anvils allowing for sufficiently high pressures to be maintained. Due to the importance of such a gasket, the properties of a material forming such a gasket may be crucial. A remainder of a cell, that part not forming the gasket, may require significantly different material properties. Specifically, the remainder may need to flow more easily to balance forces within the cell. Thus, it may be desirable for the gasket material, or base 826*a* of the embodiment shown in FIG. 8*a*, to be less fluidic under HPHT conditions than the remainder material, or remainder 828*a*.

Figure 8B:
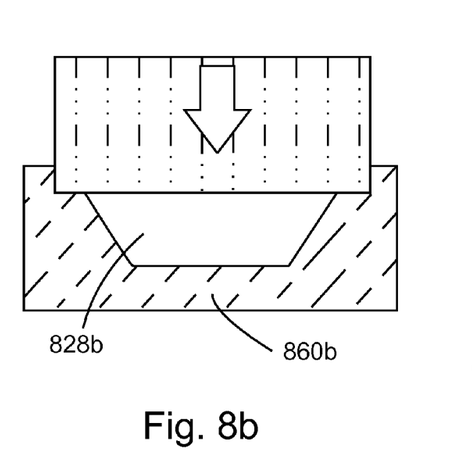
FIGS. 8b and 8c are schematic representations of an embodiment of a synthetic pyrophyllite pressing operation.
Figure 8C:
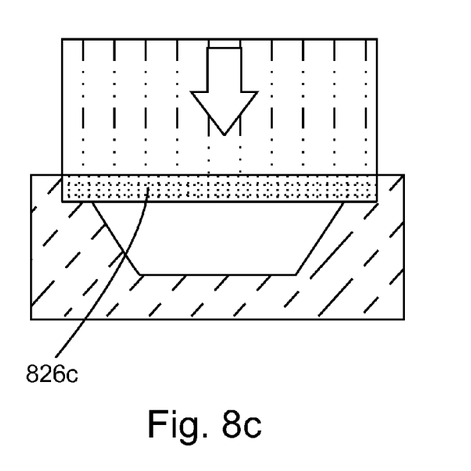

While forming a cell comprising different material properties on the inside from the outside may be difficult when working with a solid cube, pressing synthetic pyrophyllite may be a straightforward operation for creating a pyramidal shaped form comprising multiple materials as shown in the embodiment of FIG. 8*a*. For instance, FIGS. 8*b* and 8*c* show embodiments of a synthetic pyrophyllite pressing operation wherein a remainder material 828*b* is first pressed into a mold 860*b* followed by a base material 826*c* comprising different material properties into the same mold 860*b*. A cubic cell comprising different material properties on the inside from the outside may then be created by fitting together a plurality of pyramidal shaped forms as discussed previously.

Figure 9:
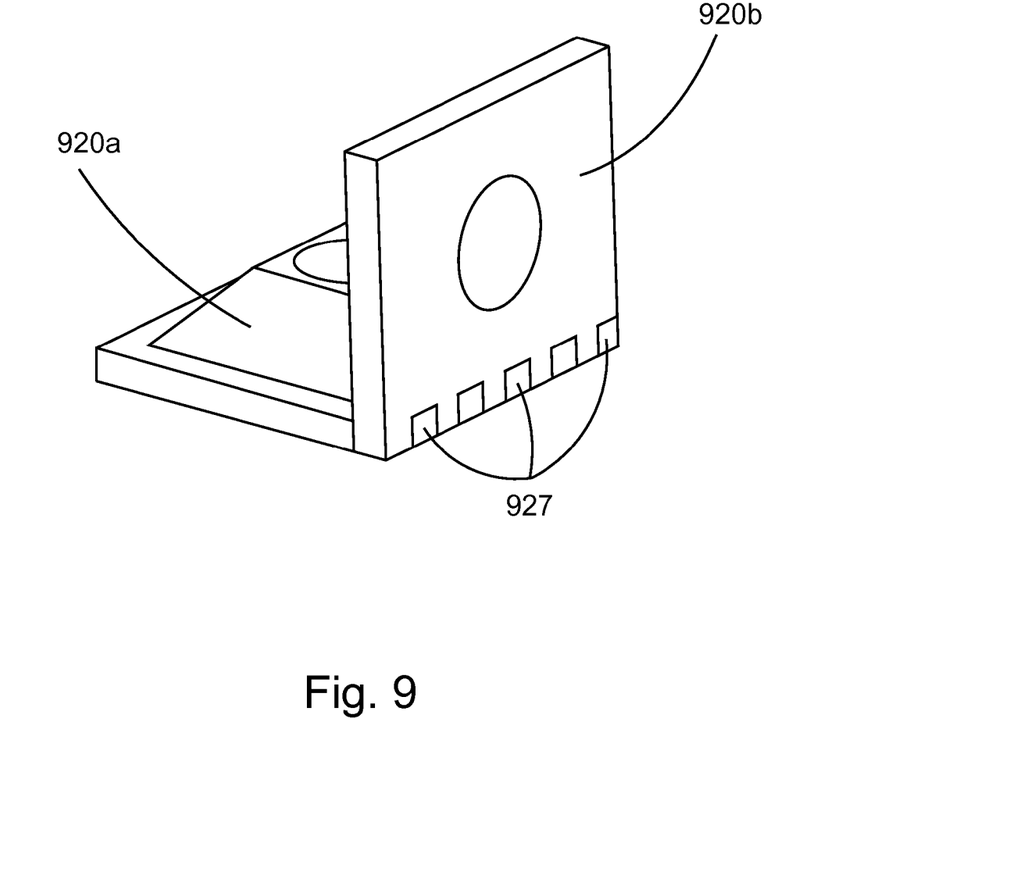
FIG. 9 is a perspective view of an embodiment of dovetails holding edges of generally pyramidal shaped forms together.

Another advantage of forming a balanced cell partially from generally pyramidal shaped forms 920*a*, *b* is the ability to hold at least portions of the cell together by joining edges of adjacent pyramidal shaped forms 920*a*, *b* with dovetails 927 as shown in an embodiment shown in FIG. 9.

Figure 10A:
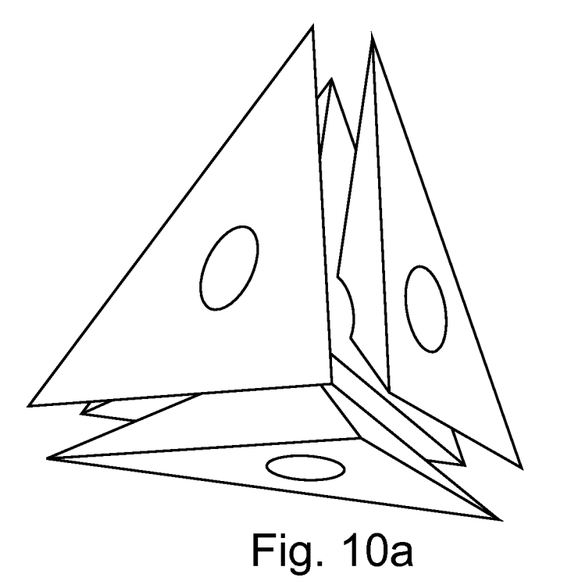
FIGS. 10a and 10b are perspective views of embodiments of HPHT cell configurations shaped as a tetrahedron and a dodecahedron respectively.
Figure 10B:
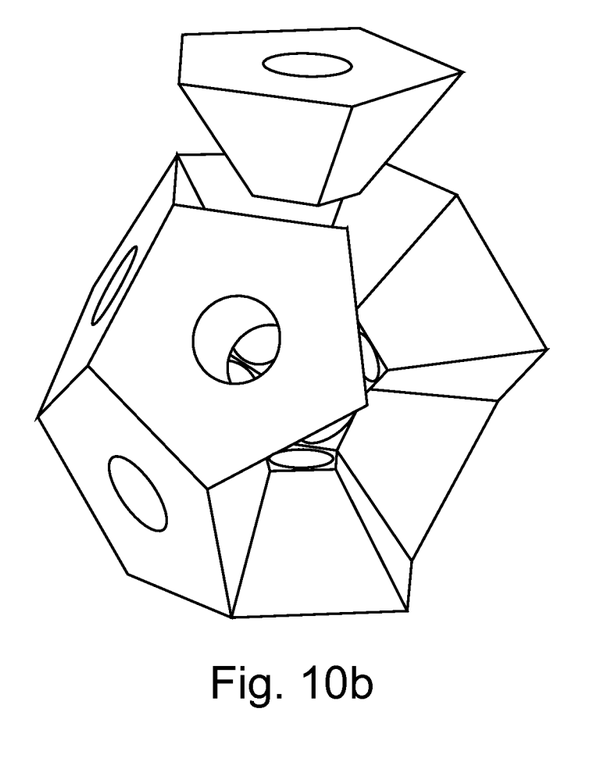

While we have generally discussed substantially cubic shaped cells up to this point where each of a plurality of sides of the cell are generally planar and disposed at substantially similar angles from adjacent sides, those of skill in the art will recognize that other shapes, such as a tetrahedron and a dodecahedron could be used with the present invention as well. Embodiments of each are shown in FIGS. 10*a* and 10*b* respectively.

Whereas the present invention has been described in particular relation to the drawings attached hereto, it should be understood that other and further modifications apart from those shown or suggested herein, may be made within the scope and spirit of the present invention.

The invention claimed is:

1. A cell for a high-pressure high-temperature press, comprising:
    a body with a plurality of canisters disposed therein;
    at least one heater element adjacent each particular canister for individually heating each particular canister; and
    at least two electrical circuits each passing through at least one different heater element.

2. The cell of claim 1, further comprising at least one temperature sensor adjacent each particular canister.

3. The cell of claim 1, further comprising at least one temperature sensor adjacent each particular heater element.

4. The cell of claim 1, further comprising one electrically conductive tube disposed about a diameter of each particular canister.

5. The cell of claim 1, wherein each of the electrical circuits passes through at least two of the heater elements and a center form within the body.

6. A method for generating heat within a high-pressure high-temperature press, comprising:
    providing a plurality of canisters disposed within a body and at least one heater element adjacent each particular canister for individually heating each particular canister; and
    forming at least two electrical circuits each passing through at least one different heater element.

7. The method of claim 6, further comprising determining a voltage drop over at least one of the heater elements from voltages at anvils adjacent the body.

8. The method of claim 6, further comprising determining an amount of heat generated by at least one of the heater elements from voltages at anvils adjacent the body.

9. The method of claim 6, further comprising regulating a voltage drop over at least one of the heater elements by adjusting voltages at anvils adjacent the body.

10. The method of claim 6, wherein the at least two electrical circuits each pass through at least one different anvil.

11. The method of claim 10, further comprising determining a difference in electrical resistance between at least one different heater element, forming part of a first electrical circuit, and at least one different heater element, forming part of a second electrical circuit, from voltages at anvils adjacent the body.

12. The method of claim 6, further comprising alternating between at least two of the electrical circuits.

13. The method of claim 6, wherein each of the electrical circuits passes through at least two of the heater elements.

14. The method of claim 13, wherein each of the electrical circuits passes through at least one shared heater element and at least one different heater element.

15. The method of claim 14, wherein each of the electrical circuits passes through a center form.

16. The cell of claim 1, wherein each of the electrical circuits passes through at least one shared heater element and at least one different heater element.

17. The cell of claim 1, wherein the at least two electrical circuits each pass through at least one different anvil.

* * * * *